US012562828B2

(12) United States Patent
Roux

(10) Patent No.: US 12,562,828 B2
(45) Date of Patent: Feb. 24, 2026

(54) UHF VALIDATIONS ERGONOMY

(71) Applicant: Conduent Business Services, LLC, Florham Park, NJ (US)

(72) Inventor: Pascal Roux, Chabeuil (FR)

(73) Assignee: Conduent Business Services, LLC, Florham Park, NJ (US)

( * ) Notice: Subject to any disclaimer, the term of this patent is extended or adjusted under 35 U.S.C. 154(b) by 357 days.

(21) Appl. No.: 18/139,163

(22) Filed: Apr. 25, 2023

(65) Prior Publication Data

US 2024/0364438 A1     Oct. 31, 2024

(51) Int. Cl.
| | |
|---|---|
| H04B 17/373 | (2015.01) |
| G07C 9/29 | (2020.01) |
| H04B 5/77 | (2024.01) |
| H04B 17/318 | (2015.01) |

(52) U.S. Cl.
CPC ............. H04B 17/373 (2015.01); G07C 9/29 (2020.01); H04B 5/77 (2024.01); H04B 17/318 (2015.01)

(58) Field of Classification Search
CPC combination set(s) only.
See application file for complete search history.

(56) References Cited

U.S. PATENT DOCUMENTS

| | | | |
|---|---|---|---|
| 8,717,175 B2 | 5/2014 | Fein | |
| 9,536,117 B2 | 1/2017 | Barvick et al. | |
| 9,747,477 B2 | 8/2017 | Manzi | |

| | | | |
|---|---|---|---|
| 10,339,436 B2 | 7/2019 | Huhtasalo | |
| 11,049,089 B2 | 6/2021 | Evans | |
| 2005/0206498 A1 | 9/2005 | Tsui et al. | |
| 2014/0066098 A1* | 3/2014 | Stern | ................... H04L 12/2801 455/456.3 |
| 2014/0292481 A1* | 10/2014 | Dumas | ..................... G07C 9/28 340/5.61 |
| 2019/0080280 A1* | 3/2019 | Tingler | .............. G06K 7/10475 |

(Continued)

FOREIGN PATENT DOCUMENTS

| | | | | |
|---|---|---|---|---|
| CN | 102034070 A | * | 4/2011 | |
| CN | 107742351 A | * | 2/2018 | ......... G07C 9/00182 |

(Continued)

OTHER PUBLICATIONS

Gi-Hyun Hwang and Dae-Ki Kang, "Design and Analysis of High-Performance Smart Card with HF/UHF Dual-Band RFID Tag and Memory Functions", International Journal of Distributed Sensor Networks vol. 2013, Article ID 562954, 8 pages, http://dx.doi.org/10.1155/2013/562954.

(Continued)

*Primary Examiner* — Samina F Choudhry

(74) *Attorney, Agent, or Firm* — KPPB LAW; Kermit D. Lopez; Luis M. Ortiz

(57) ABSTRACT

A method and apparatus for automatically accessing a barrier or an electronic system can involve reading from a memory of a contactless device, a received signal strength information (RSSI) threshold associated with a user of the contactless device. An RSSI can be compared with the RSSI threshold to determine when the contactless device is within an acceptable distance from a barrier. The barrier can be opened for passage beyond the barrier and/or the electronic system can be accessed when the RSSI exceeds the RSSI threshold.

12 Claims, 6 Drawing Sheets

(56) References Cited

U.S. PATENT DOCUMENTS

2020/0066060 A1    2/2020   Feuillette et al.

FOREIGN PATENT DOCUMENTS

CN        110363884  A  *  10/2019   .............. G07C 9/38
GB        2495217  A      4/2013

OTHER PUBLICATIONS

"Radio-frequency identification", Wikipedia, Retrieved from "https://en.wikipedia.org/w/index.php?title=Radio-frequency_identification&oldid=1143561919".

Hassan F. Mohsin , Karrar A. Kadhim, and Zaid N. Khudhier, "Study and performance analysis of received signal strength indicator (RSSI) in wireless communication systems", International Journal of Engineering & Technology, 6 (4) (2017) 195-200.

"Received signal strength indication", Wikpedia, Retrieved from "https://en.wikipedia.org/w/index.php?title=Received_signal_strength_indication&oldid=1127458112".

"The Basics: Why is My Wi-Fi so Slow and How Do I Fix It, Understanding RSSI", https://www.metageek.com/training/resources/understanding-rssi/, downloaded Feb. 19, 2023.

Klemens Sattlegger and Uli Denk, "Navigating your way through the RFID jungle", White Paper, Texas Instruments, 2014.

"Ultra high frequency", Wikipedia, https://en.wikipedia.org/wiki/Ultra_high_frequency.

* cited by examiner

30

31

33

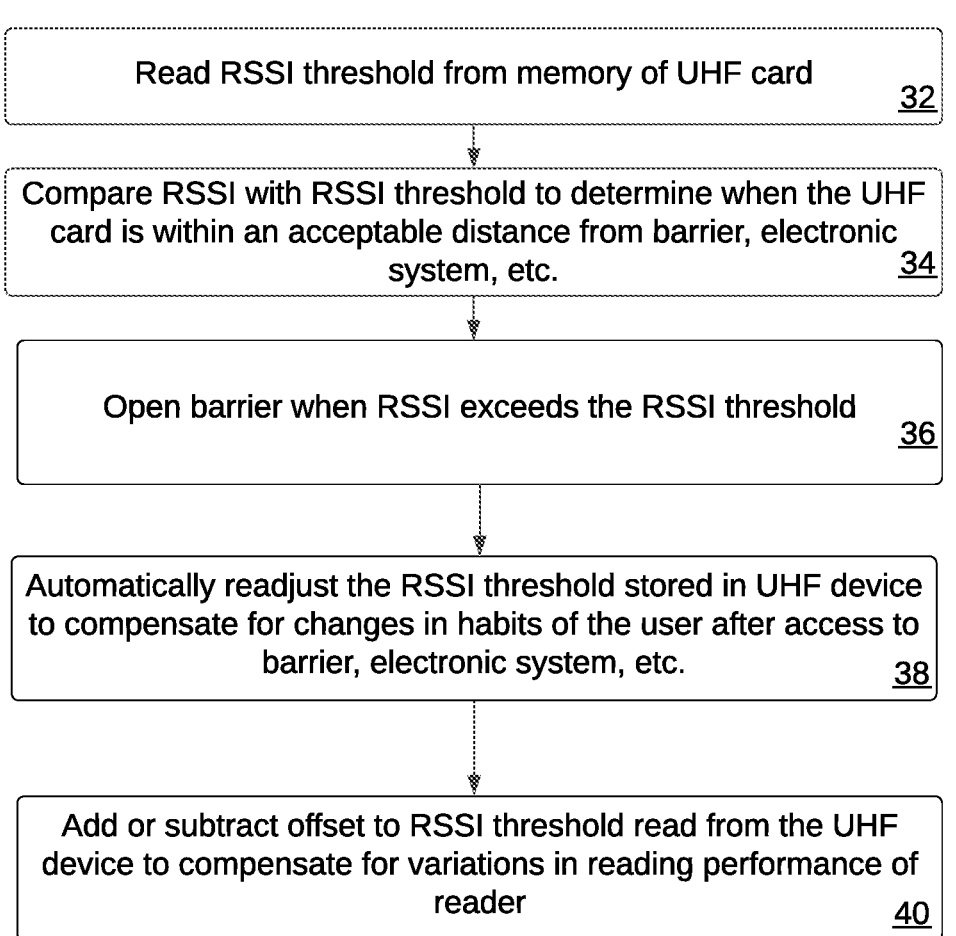

Read RSSI threshold from memory of UHF card                    32

Compare RSSI with RSSI threshold to determine when the UHF card is within an acceptable distance from barrier, electronic system, etc.                    34

Open barrier when RSSI exceeds the RSSI threshold                    36

Automatically readjust the RSSI threshold stored in UHF device to compensate for changes in habits of the user after access to barrier, electronic system, etc.                    38

Add or subtract offset to RSSI threshold read from the UHF device to compensate for variations in reading performance of reader                    40

FIG. 5

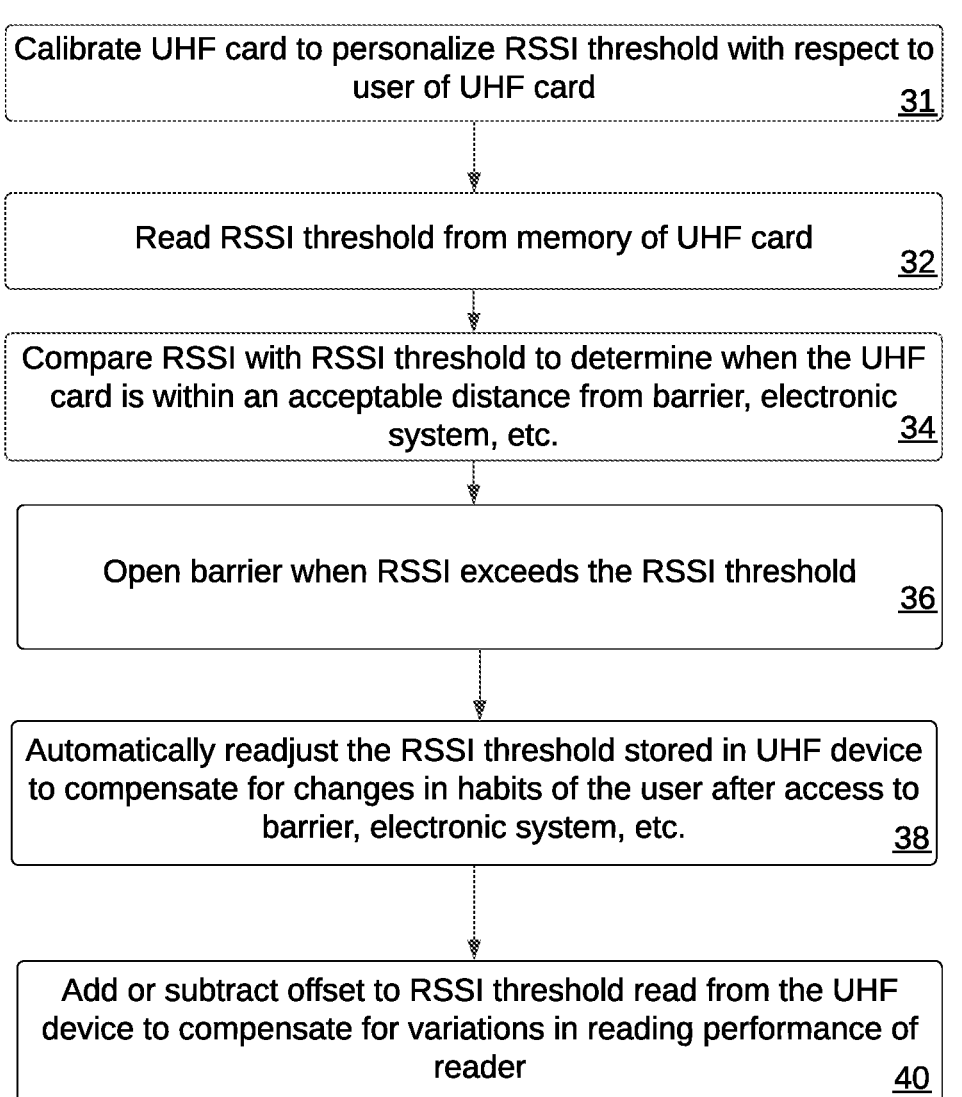

35

Calibrate UHF card to personalize RSSI threshold with respect to user of UHF card          31

Read RSSI threshold from memory of UHF card          32

Compare RSSI with RSSI threshold to determine when the UHF card is within an acceptable distance from barrier, electronic system, etc.          34

Open barrier when RSSI exceeds the RSSI threshold          36

Automatically readjust the RSSI threshold stored in UHF device to compensate for changes in habits of the user after access to barrier, electronic system, etc.          38

Add or subtract offset to RSSI threshold read from the UHF device to compensate for variations in reading performance of reader          40

FIG. 6

UHF VALIDATIONS ERGONOMY

TECHNICAL FIELD

Embodiments are related to the field of radio-frequency identification (RFID) technology including RFID systems, techniques, and devices such as RFID smartcards and tags. Embodiments further relate to ultra-high frequency (UHF) RFID systems, techniques, and devices. Embodiments also relate to the use of RFID devices and systems for use by disabled users including passengers and commuters.

BACKGROUND

RFID technology harnesses electromagnetic fields to transfer data wirelessly. One of the primary uses for RFID technology is the automatic identification and tracking of objects via UHF tags, which may be attached or incorporated into a variety of objects. RFID uses electromagnetic fields to automatically identify and track tags attached to objects. An RFID device and/or system typically includes a tiny radio transponder, a radio receiver and a transmitter. When triggered by an electromagnetic interrogation pulse from a nearby RFID reader, the tag transmits digital data back to the reader.

Examples include credit cards, passports, license plates, identity cards, cellphones/mobile devices, etc. RFID technology also has applications in numerous areas, including, but not limited to, electronic tolling, parking access, border control, payment processing, asset management, and transportation. Thus, for example, a license plate that includes an UHF tag may be used for the purposes of electronic toll collection (ETC), electronic vehicle registration (EVR), border crossing etc.

An UHF tag can be configured to provide operating frequencies in order to be used in a wider range of applications. For example, an UHF tag may support high frequencies (e.g., 13.56 megahertz (MHZ)) and ultra-high frequencies (e.g., 915 MHz or 2.45 gigahertz (GHz)). Ultra-high frequency (UHF) RFID systems can typically provide a greater read distances than high frequency (HF) RFID systems (e.g., near field communication (NFC) systems).

Many disabled persons use RFID devices (e.g., contactless proximity smartcard, UHF tags, etc.) in their daily lives to access public transportation, electronic systems, barriers such as secure gates and doors, and other types of electromechanical devices and hardware.

In a typical commuting scenario, for example, a disabled passenger need to have his or her contactless proximity smartcard (e.g., ~5 cm) validated or ask for assistance if he or she is unable to present the contactless proximity smartcard. One of the problems with conventional UHF devices (e.g., such as those used for toll collection in vehicles) is that such UHF devices are very sensitive to human body proximity. For example, when a UHF device is too close to the body, its reading distance may decrease a great deal. When the card is not close to the body, its ready distance may increase significantly and the user/passenger may open a gate or access a barrier or electronic system "by accident", simply for being too close to the gate/barrier or electronic system and without intending to access the barrier or electronic system.

These problems may be amplified by different types of disabilities (e.g., wheelchair, no arms, etc.), which may lead to different UHF smartcard effects, for example, that depend on the orientation and/or proximity of the UHF device with respect to the passenger's/user's body or wheelchair. Different UHF cards and/or UHF card readers may also have difference performances.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide improved methods, systems and devices for access control utilizing an ultra-high frequency device.

It also an aspect of the methods to provide methods and devices for automatically accessing a barrier and/or an electronic system.

It is another aspect of the embodiments to provide for a UHF device in which the effects of proximity sensitivities with a respect to a user of the UHF device are compensated so that the user can carry his or her card as desired.

It is also an aspect of the embodiments to provide methods, systems, and devices in which a received signal strength information (RSSI) can be used to determine when a UHF device is at an acceptable distance from a barrier or electronic system to open the barrier or access the electronic system (e.g., electronic kiosk, detector, mounts and other hardware or electromechanical devices).

The aforementioned aspects and other objectives and advantages can now be achieved as described herein. In an embodiment, a method for automatically accessing a barrier, can involve reading from a memory of a contactless device, a received signal strength information (RSSI) threshold associated with a user of the contactless device, comparing an RSSI with the RSSI threshold to determine when the contactless device is within an acceptable distance from a barrier, and opening the barrier for passage beyond the barrier when the RSSI exceeds the RSSI threshold.

In an embodiment, the contactless device can comprise a smartcard.

An embodiment may further involve calibrating the contactless device to personalize the RSSI threshold with respect to the user.

An embodiment may also involve automatically readjusting the RSSI threshold stored in the contactless device to compensate for changes in habits of the user after passage beyond the barrier by the user.

An embodiment may further involve increasing/decreasing the RSSI threshold read in the contactless device to compensate for variations in a reader performance of a reader responsible for reading from the memory of the contactless device, the RSSI threshold associated with the user of the contactless device.

In an embodiment, the contactless smartcard may comprise an ultra-high frequency (UHF) card.

In an embodiment, a method for automatically accessing an electronic system, can involve reading from a memory of a contactless device, a received signal strength information (RSSI) threshold associated with a user of the contactless device, comparing an RSSI with the RSSI threshold to determine when the contactless device is within an acceptable distance from an electronic system, and allowing the user to access the electronic system when the RSSI exceeds the RSSI threshold.

In an embodiment, an apparatus for automatically accessing a barrier, can include: a contactless device having a memory, wherein a reader reads from the memory of the contactless device, a received signal strength information (RSSI) threshold associated with a user of the contactless device. An RSSI can be compared with the RSSI threshold to determine when the contactless device is within an acceptable distance from a barrier, and the barrier can be opened for passage beyond the barrier when the RSSI exceeds the RSSI threshold.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the embodiments.

FIG. 5 illustrates a flow chart of operations depicting logical operational steps of a method for automatically accessing a barrier, an electronic systems, and/or other electromechanical devices and hardware, in accordance with an embodiment.

Like reference numerals utilized herein can refer to identical or similar parts or elements.

DETAILED DESCRIPTION

Figure 1:
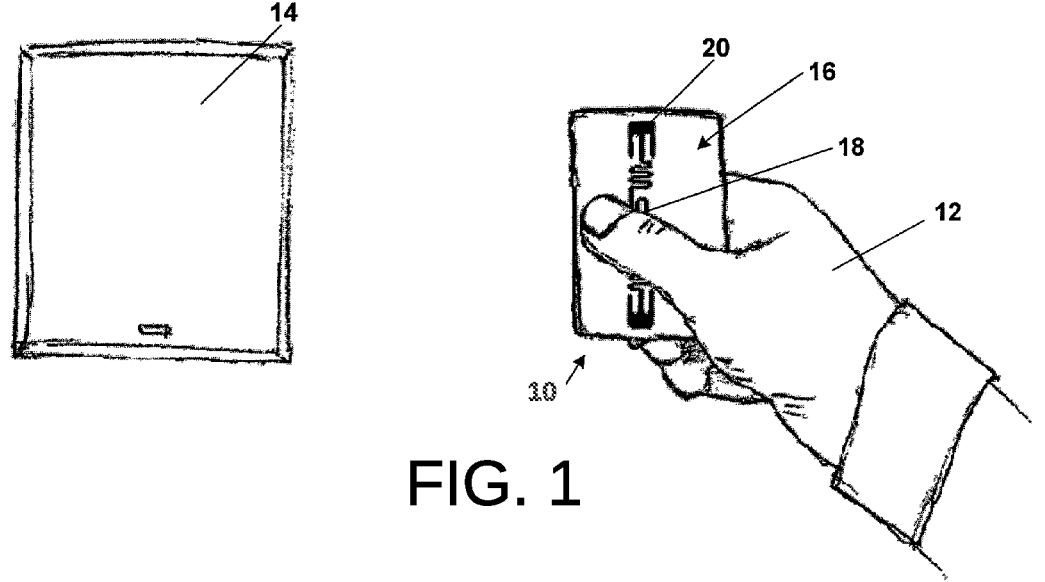
FIG. 1 illustrates a pictorial diagram of a user attempting to initiate communication between a UHF card and an associated card reader, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. In addition, terms or phrases such as "at least one" may refer to "one or more". For example, "at least one widget" may refer to "one or more widgets".

Several aspects of data-processing systems are presented herein with reference to various systems and methods. These systems and methods are described in the following detailed description and illustrated in the accompanying drawings by various blocks, modules, components, circuits, steps, processes, algorithms, etc. (collectively can be referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

An example of a data processing system or device is a computing system, including devices and systems, which contain microcircuits, IC's, silicon chips, microcircuits, computer chips, chips, etc. In this respect, an RFID device such as a UHF device is an example of a data processing system.

FIG. 1 depicts a pictorial diagram of a UHF card 10 held by a user 12 in close proximity to a card reader 14, in accordance with an embodiment. The UHF card 10 shown in FIG. 1 is a UHF device that can include a UHF tag 16 comprising an electronic circuit 18 and an antenna 20. The UHF tag 16 may be an active UHF tag or a passive tag depending upon the type of UHF card used and contactless access required by a particular application.

The UHF card 10 of FIG. 1 can operate as a contactless access card (also referred to as a proximity card or proximity access card) in the UHF range and can employ the passive UHF tag 16. As shown in FIG. 1, the antenna 20 of the UHF card 10 can extend in an approximate oval or rounded rectangular shape around the periphery of the access card 10, with the electronic circuit 18 located on one end of the UHF card 10.

A user 12 using a UHF card 10 in the manner shown in the drawing may accidentally detune the UHF tag 16 with his/her hand by obscuring and/or being in close contact with a large portion of the perimeter-oriented antenna 20. The result of such detuning would require the user 12 to reorient the access card 10 and/or to bring the access card 10 even closer to the access card reader 14. Although not shown in the figure, a user wearing an UHF card 10 against his/her body on a lanyard or other retractable device would likewise detune the UHF tag 16 either by handling the access card 10 with his/her hands to initiate communication between the reader 14 and the card 10, or by attempting to initiate communication between the reader 14 and the access card 10 with the card abutting the user's body.

Furthermore, as discussed previously, the UHF card 10 may be very sensitive to human body proximity of the user 12. When UHF card is too close to the body of the user 12, its reading distance may decrease a great deal. When the UHF card 10 is not close to the body, its ready distance may increase significantly and the user/passenger may open a gate or access a barrier or electronic system "by accident", simply for being too close to the gate/barrier or electronic system and without intending to access the barrier or electronic system.

In any event, requiring a user to reorient or otherwise reattempt communication between the access card 10 and the card reader 14 defeats the advantages provided by UHF access card technology. The embodiments address these concerns and others by compensating these effects so that a disabled user can carry his or her UHF card 10 as they desire, while offering a relatively homogeneous reading distance.

The UHF card 10 may be used in a variety of access applications, and may have a variety of configurations, including, but not limited to, a dual terminal configuration or a single terminal configuration. The UHF tag 16 of the UHF card 10 may comprise one or more electronic circuits such as the electronic circuit 18 and one or more antennas such as the antenna 20. Such electronic circuits and antennas are available from a variety of manufacturers. These circuits may also be referred to as microcircuits, IC's, silicon chips, microcircuits, computer chips, chips, etc.

Figure 2:
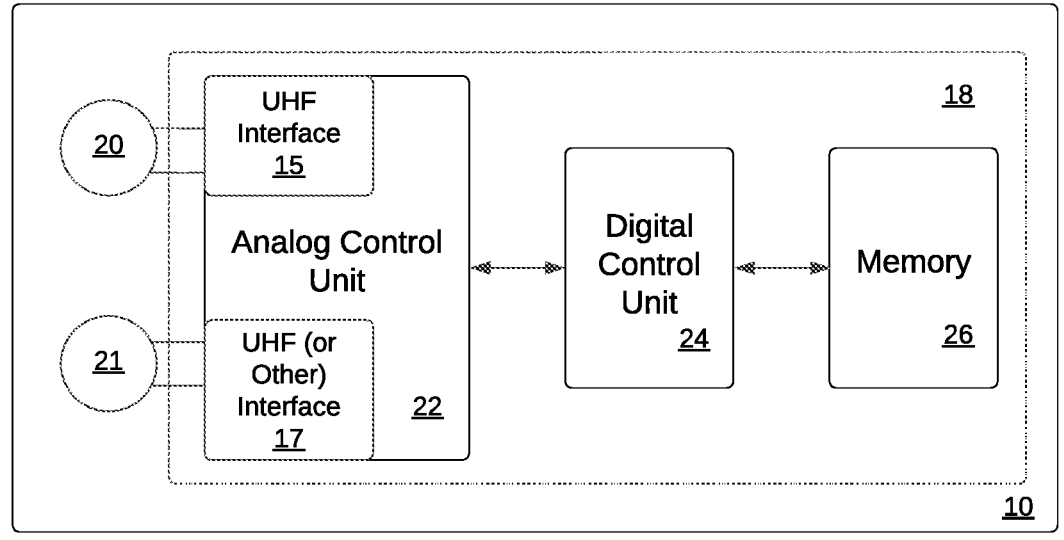
FIG. 2 illustrates a block diagram of a UHF card, which may be implemented in accordance with one possible embodiment.

FIG. 2 illustrates a block diagram of the UHF card 10 shown in FIG. 2, in accordance with one embodiment. That is, FIG. 2 depicts an exemplary implementation of UHF card 10 and elements thereof, which are used merely to illustrate one possible architectural overview of an exemplary embodiment of the UHF card 10. It should be appreciated that different types of UHF cards may be implemented in place of UHF card 10 in other embodiments.

The UHF tag 16 of the UHF card 10 may include elements such as the electronic circuit 18, which may be implemented as, for example, an integrated circuit chip or microcircuit as discussed above and can include an analog control unit 22 that can comprise one or more interfaces such as a UHF interface 15 and a UHF (or other) interface 17. That is, the UHF (or other) interface 17 may in some embodiments be implemented as another type of interface such as a high frequency (HF) interface. It can be appreciated that only one interface may be implemented such as UHF interface 15 in accordance with an embodiment or multiple interfaces may be implemented with the electronic circuit 18 in other embodiments.

In the design shown in FIG. 2, the UHF interface 15 and the interface 17 are elements that can interface respectively with the antenna 20 and the antenna 21. Interfaces 15 and 17 may include a matching that allows the front end to be tuned for operation at a UHF range. In some embodiments, the UHF interface 15 and/or 17 can be used, for example, for a data reading function that enables high data rate. In one embodiment, the UHF interface 15 may be coupled to a UHF loop antenna 20. In some embodiments, the UHF interface 17 may be used for the writing (e.g., personalization) of identification information into the memory 26. In one embodiment, the UHF interface 17 can be coupled to a coil antenna 21 (e.g., a wound spiral of insulated wire).

In one embodiment, the aforementioned chip can be a frequency-independent chip. In this case, a single manufactured silicon chip, when properly connected and matched to an appropriate antenna, can operate at any of the relevant frequencies assigned for a dual-frequency interface, comprising interfaces 15 and 17 and analog control unit 22. In other embodiments, the aforementioned chip can also be a one-frequency or multi-frequency chip. In these cases, the chip may be uniquely designed and characterized to operate with a specific antenna at one or a few specific frequencies.

The electronic circuit 18 may also include a digital or baseband portion that includes the memory 26 and a digital control unit 24 coupled between the analog control unit 22 and the memory 26. The digital control unit 24 can include circuits to perform functions such as A/D conversion, encoding/decoding, modulation/demodulation, and other digital signal processing functions. The memory 26 can store identification information, and other information, such as account information, identifying information, etc., which can be accessed and updated via command signals received via the control units 22 and 24 and/or based on a dual-frequency of analog control unit 24.

In some embodiments, access to the memory 26 can be granted based on a security key in accordance with the provision of secure identification solutions for the UHF tag 16. The memory 26 can store the information, which may be required to implement one or more protocols associated with one or more applications. In certain embodiments, a particular application can be configured to work with command signals transmitted over one of multiple frequencies received via the radio frequency front end. In other applications, a particular application can be configured to work with command signals received over a single frequency.

Figure 3:
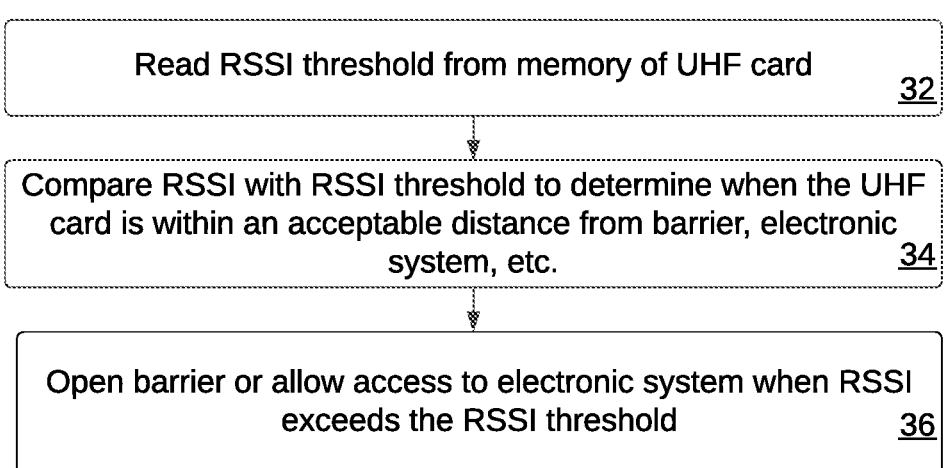
FIG. 3 illustrates a flow chart of operations depicting logical operational steps of a method for automatically accessing a barrier, an electronic systems, and/or other electromechanical devices and hardware, in accordance with an embodiment.

FIG. 3 illustrates a flow chart of operations depicting logical operational steps of a method 30 for automatically accessing a barrier, an electronic systems, and/or electro-mechanical devices and hardware, in accordance with an embodiment. The elements or blocks shown in FIG. 3 represent steps, operations and instructions of method 30. As shown at block 32, a step or operation can be implemented to read from a memory of a contactless device, a received signal strength information (RSSI) threshold associated with a user of the contactless device. An example of such a contactless device is the UHF device 10 discussed previously with respect to FIG. 2. An example of such a memory is the memory 26 also shown in FIG. 2.

Next, as shown at block 34, a step or operation can be implemented to compare comparing an RSSI with the RSSI threshold to determine when the contactless device is within an acceptable distance from a barrier, electronic system or other electromechanical device or hardware. Thereafter, as shown at block 36, a step or operation can be implemented to open the barrier for passage beyond the barrier or access an electronic system when the RSSI exceeds the RSSI threshold.

Figure 4:
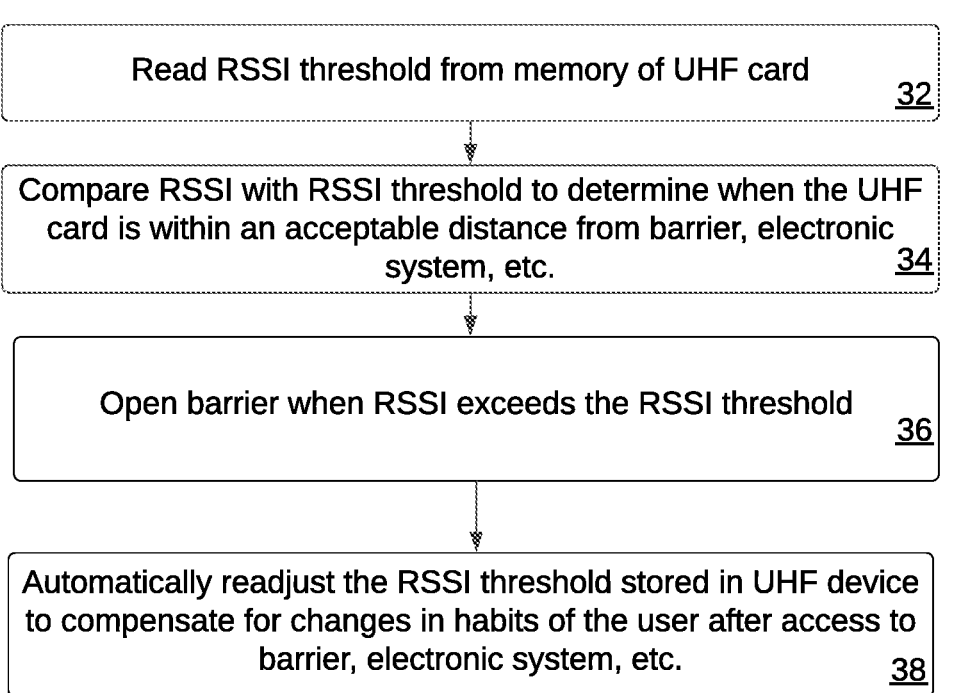
FIG. 4 illustrates a flow chart of operations depicting logical operational steps of a method for automatically accessing a barrier, an electronic systems, and/or other electromechanical devices and hardware, in accordance with an embodiment.

FIG. 4 illustrates a flow chart of operations depicting logical operational steps of a method 31 for automatically accessing a barrier, an electronic systems, and/or electro-mechanical devices and hardware, in accordance with an embodiment. The elements or blocks shown in FIG. 3 represent steps, operations and instructions of method 31. Note that the operational steps shown in FIG. 4 are similar to those depicted in FIG. 3 with the addition of a step or operation as shown at block 38 for automatically readjusting the RSSI threshold stored in the contactless device to compensate for changes in habits of the user after passage beyond the barrier and/or access to the electronic system or other hardware by the user.

FIG. 5 illustrates a flow chart of operations depicting logical operational steps of a method 33 for automatically accessing a barrier, an electronic systems, and/or electro-mechanical devices and hardware, in accordance with an embodiment. The elements or blocks shown in FIG. 5 represent steps, operations and instructions of method 33. The steps/operations shown in FIG. 5 are similar to those shown in FIG. 4 with the addition of the operation shown at block 40, which can involve increasing/decreasing the RSSI threshold read in the contactless device to compensate for variations in the reader performance of a reader responsible for reading from the memory of the contactless device, the RSSI threshold associated with the user of the contactless device.

FIG. 6 illustrates a flow chart of operations depicting logical operational steps of a method 35 for automatically accessing a barrier, an electronic systems, and/or electro-mechanical devices and hardware, in accordance with an embodiment. The elements or blocks shown in FIG. 6 represent steps, operations and instructions of method 35. The steps/operations shown in FIG. 6 are similar to those shown in FIG. 5 with the addition of the operation shown at block 31, which involves calibrating the UHF device 10 (i.e., contactless UHF card) to personalize the RSSI threshold with respect to the user.

Figure 7:
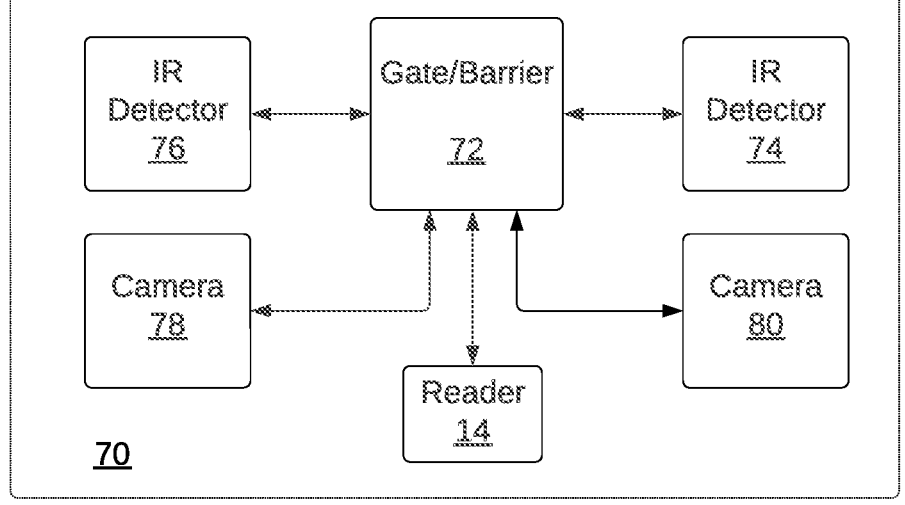

FIG. 7 illustrates a block diagram of a security detection system 70, which can be implemented in accordance with an embodiment. As shown in FIG. 7, a gate/barrier 72 may communicate electronically via wired and/or wireless communications with one or more infrared (IR) detectors such as IR detector 76, IR detector 74, and so forth. The gate/barrier 72 may also communicate with one or more digital video cameras (e.g., top view video cameras) such as digital video camera 78, digital video camera, 80 and so on. The reader 14 can also communicate electronically with the gate/barrier 72 via wired and/or wireless communications.

The security detection system 70 can function as a gate (e.g., security and fraud) detection system (e.g., with the IR detectors, top view video cameras, etc.), which can also be used to avoid any gate opening when no-one is really close to the gate/barrier 72. For example, if a user with a low RSSI threshold (because he or she usually wears the UHF device 10 close to his or body body) arrives with his or her card far from their body, the gate/barrier 72 could open too early. An advantage of using the security detection system 70, however, is to delay the gate/barrier 72 from opening until someone is detected close to the gate/barrier 72. In many cases, this will involve a disabled user (but in some cases, the user may be someone else).

Figure 8:
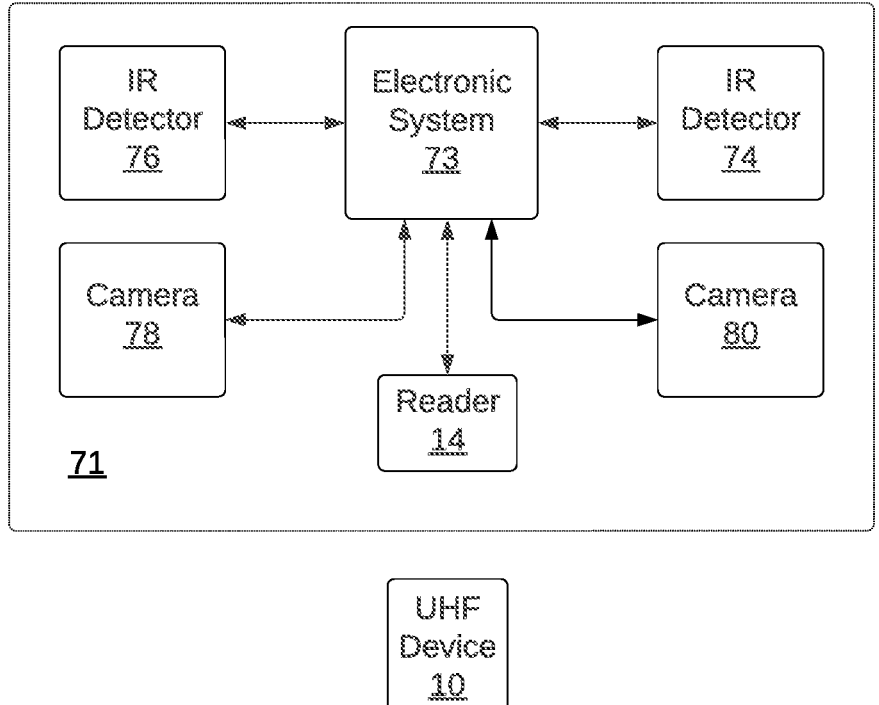

FIG. 8 illustrates a block diagram of a security detection system 71, which can be implemented in accordance with an embodiment. The security detection system 71 is similar to the security detection system 70 shown in FIG. 7, but with the use of an electronic system 73 instead of the gate/barrier 72. That is, in some situations a user of the UHF device 10 may wish to access the electronic system 73 (e.g., an electronic kiosk and/or electromechanical devices and hardware subject to the electronic kiosk), which forms a part of the security detection system 71. The scenario shown in FIG. 8 can be implemented to avoid accidental access of the electronic system 73 by a user of the UHF device 10.

Based on the foregoing, it can be appreciated that a goal of the embodiments involves the use of UHF devices (e.g., long range UHF smartcards or tags) in a manner that takes into account the sensitivity of human body effects. As discussed previously, when a conventional UHF device is too far to a body, its reading distance increases a great deal and a user (e.g., a passenger) may open a barrier or access an electronic system 'by accident', simply by being too close to the barrier or electronic system and without intending to access the barrier or electronic system. This problem may be amplified by a user's particular disabilities (e.g., wheelchair, no arms, etc.), which can lead to problematic issues stemming different a UHF device's height, proximity with the user's body or wheelchair, and so forth.

Different cards (and readers) may also offer different performances. The embodiments can use the RSSI in a manner that determines if the card is at an acceptable distance to open a barrier or access an electronic system or other hardware or electromechanical devices. The RSSI threshold is typically very different for each disabled user because of the manner in which he or she may hold the UHF device.

After "calibration", a personalized threshold can be stored in the user's UHF device itself, so that the reader can read it before a determination is made as to whether the UHF device is too far from a barrier/electronic system to access it. Automatic readjustment of the RSSI threshold at each passage or access may be implemented to compensate for changes in a user's habits. Barrier or gate "calibration" may also be considered if readers do not offer the same performance, so that the RSSI thresholds read with respect to a UHF device can be slightly "adapted" by each barrier or electronic system before deciding to open the barrier or access the electronic system or other electromechanical device or hardware.

The embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus and may create means for implementing the functions/acts specified in the block or blocks.

To be clear, the disclosed embodiments can be implemented in some cases in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features may be considered a special-purpose computer designed with a purpose of image processing images captured by an image-capturing device, such as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means, which can implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module as utilized may also simply refer to an application, such as a computer program designed to assist in the performance of a specific task, such as word processing, accounting, inventory management, etc.

The disclosed embodiments can constitute an improvement to a computing system (e.g., such as the UHF device 10 and related elements) rather than simply the use of a computer computing system as a tool. The disclosed modules, instructions, steps and functionalities discussed herein can result in a specific improvement over prior systems, resulting in improved data-processing systems.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged.

The accompanying claims, for example, present elements of the various steps, operations or instructions in a sample order, and are not meant to be limited to the specific order or hierarchy presented.

The methods, systems and devices as described and claimed herein are non-abstract. No description has been offered of any abstract implementations. Accordingly, the claims are to be construed as covering only non-abstract subject matter. Any person who construed them otherwise would be construing them incorrectly and without regard to the specification.

Applicant and/or the inventors, acting as their own lexicographer, hereby defines "non-abstract" as the complement of "abstract" as that term has been defined by the courts of the United States as of the filing date of this application.

The methods and systems as described herein also have a technical effect. In many cases, the technical effect will be non-obvious. However, it exists. Therefore, any person who construes the claims as lacking a technical effect is merely displaying an inability to discern the technical effect as a result of its non-obviousness.

Additionally, although it may be convenient to implement the method(s) using software instructions, it is known that virtually any set of software instructions can be implemented by specially designed hardware, which may be provided as an application-specific integrated circuit. The claims presented herein may also cover such an implementation.

Based on the foregoing, it can be appreciated that a number of different embodiments are disclosed herein. For example, in an embodiment a method for automatically accessing a barrier, can involve: reading from a memory of a contactless device, a received signal strength information (RSSI) threshold associated with a user of the contactless device; comparing an RSSI with the RSSI threshold to determine when the contactless device is within an acceptable distance from a barrier; and opening the barrier for passage beyond the barrier when the RSSI exceeds the RSSI threshold.

In an embodiment, the contactless device may be an ultra-high frequency (UHF) card.

An embodiment can further involve calibrating the contactless device to personalize the RSSI threshold with respect to the user.

An embodiment can also involve automatically readjusting the RSSI threshold stored in the contactless device to compensate for changes in habits of the user after passage beyond the barrier by the user.

An embodiment may additionally involve increasing or decreasing the RSSI threshold read in the contactless device to compensate for variations in a reader performance of a reader responsible for reading from the memory of the contactless device, the RSSI threshold associated with the user of the contactless device.

An embodiment may also involve delaying access by a user of the UHF device to the barrier by a security system comprising at least one infrared detector or at least one digital camera in communication with a reader.

In an embodiment, a method for automatically accessing an electronic system, can involve: reading from a memory of a contactless device, a received signal strength information (RSSI) threshold associated with a user of the contactless device; comparing an RSSI with the RSSI threshold to determine when the contactless device is within an acceptable distance from an electronic system; and allowing the user to access the electronic system when the RSSI exceeds the RSSI threshold.

In an embodiment, an apparatus for automatically accessing a barrier, can include a contactless device having a memory, wherein a reader reads from the memory of the contactless device, a received signal strength information (RSSI) threshold associated with a user of the contactless device. The RSSI can be compared with the RSSI threshold to determine when the contactless device is within an acceptable distance from a barrier. The barrier may be opened for passage beyond the barrier when the RSSI exceeds the RSSI threshold.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for automatically accessing a barrier, comprising:
   reading from a memory of a contactless device comprising an ultra-high frequency (UHF) tag and a memory storing identification information, a personalized received signal strength information (RSSI) threshold calibrated with respect to a user of the contactless device;
   comparing an RSSI with the RSSI threshold to determine when the contactless device is within an acceptable distance from a barrier;
   automatically readjusting the RSSI threshold stored in the contactless device after passage beyond the barrier to compensate for changes in habits of the user and for detuning of the UHF tag caused by proximity of the contactless device to the body of the user;
   delaying opening of the barrier until presence of the user is confirmed by a security detection system comprising at least one of an infrared detector or a video camera; and
   opening the barrier for passage beyond the barrier when the RSSI exceeds the RSSI threshold.

2. The method of claim 1 wherein the contactless device further comprises a UHF card comprising the UHF tag.

3. The method of claim 1 further comprising calibrating the contactless device by positioning the contactless device at one or more distances from the barrier and adjusting the RSSI threshold stored in the memory to personalize the RSSI threshold with respect to the user, including compensating for detuning of the contactless device caused by proximity of the contactless device to the body of the user.

4. The method of claim 1 further comprising automatically readjusting the RSSI threshold stored in the memory of the contactless device after each passage beyond the barrier, the readjusting being based on (i) changes in habits of the user and (ii) variations in performance of a reader responsible for reading the RSSI threshold, including detuning of the contactless device when positioned in proximity to the body of the user.

5. The method of claim 1 further comprising increasing or decreasing the RSSI threshold read from the memory of the contactless device to compensate for variations in performance of a particular reader, wherein the compensation includes calibrating the contactless device with respect to the reader so that the RSSI threshold associated with the user is adapted to that reader prior to authorizing opening of the barrier.

6. The method of claim 1 further comprising:

delaying access by the user of the UHF device to the barrier until the presence of the user is confirmed by a security detecting system comprising at least one of: at least one infrared detector or at least one digital video camera position to monitor a vicinity of the barrier, the security detection system being in communication with the reader and configured to prevent accidental opening of the barrier when no user is detected in proximity.

7. An apparatus for automatically accessing a barrier, comprising:

a contactless device having a memory comprising an ultra-high frequency (UHF) tag and a memory storing identification information, wherein a reader reads from the memory of the contactless device, a personalized received signal strength information (RSSI) threshold calibrated with respect to a user of the contactless device;

wherein an RSSI is compared with the RSSI threshold to determine when the contactless device is within an acceptable distance from a barrier;

wherein the RSSI threshold stored in the contactless device is automatically readjusted after passage beyond the barrier to compensate for changes in habits of the user and for detuning of the UHF tag caused by proximity of the contactless device to the body of the user;

wherein opening of the barrier is delayed until presence of the user is confirmed by a security detection system comprising at least one of an infrared detector or a video camera; and wherein the barrier is opened for passage beyond the barrier when the RSSI exceeds the RSSI threshold.

8. The apparatus of claim 7 wherein the contactless device further a UHF smartcard comprising the UHF tag.

9. The apparatus of claim 7 wherein the UHF tag comprises a microcircuit including an analog control unit comprising at least one UHF interface contactless device is calibrated to personalize the RSSI threshold with respect to the user.

10. The apparatus of claim 9 wherein the at least one UHF interface is coupled to a coil antenna.

11. The apparatus of claim 7 wherein the RSSI threshold read from the memory of the contactless device is increased or decreased to compensate for variations in a performance of a particular, wherein the compensation includes calibrating the contactless device with respect to the reader so that the RSSI threshold associated with the user is adapted to that reader prior to authorizing opening of the barrier.

12. The apparatus of claim 7 wherein the contactless smartcard comprises an ultra-high frequency (UHF) card.

* * * * *